F. OBIOLS.
TRAP.
APPLICATION FILED NOV. 25, 1911.
1,031,728.
Patented July 9, 1912.
2 SHEETS—SHEET 1.
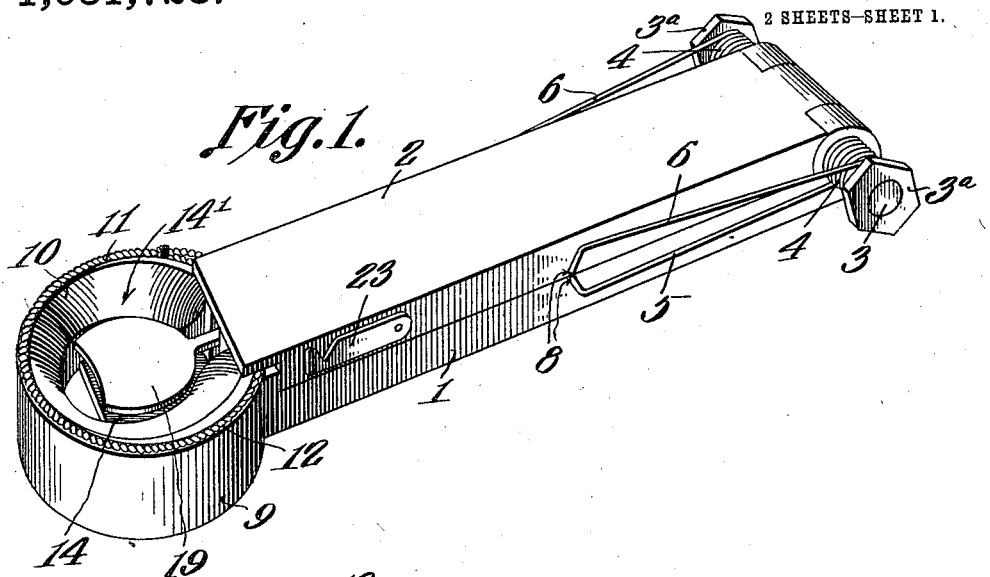
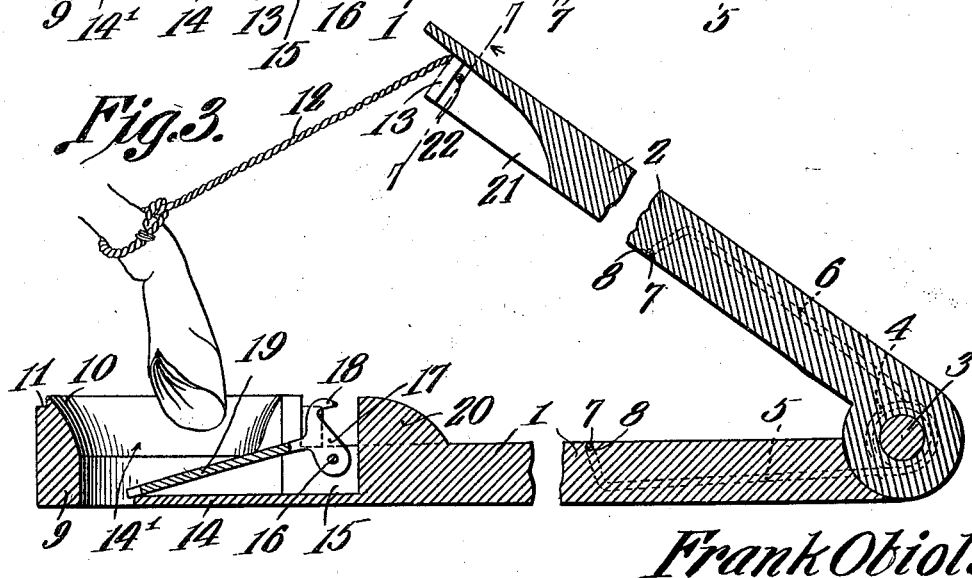
Witnesses
Frank Obiols,
Inventor
by C. A. Snow & Co.
Attorneys F. OBIOLS.
TRAP.
APPLICATION FILED NOV. 25, 1911.
1,031,728.
Patented July 9, 1912.
2 SHEETS—SHEET 2.
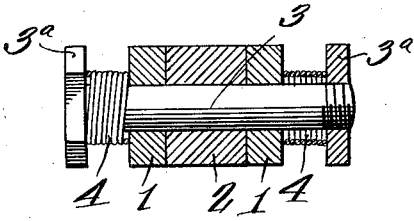
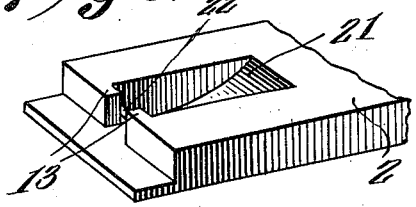
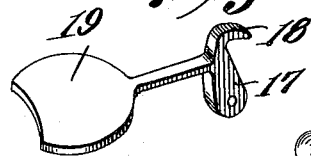
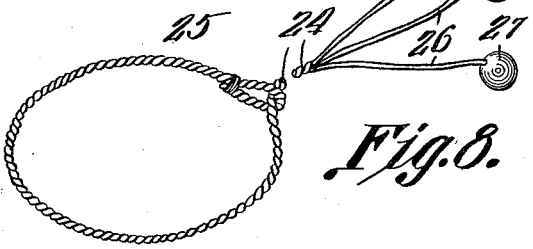
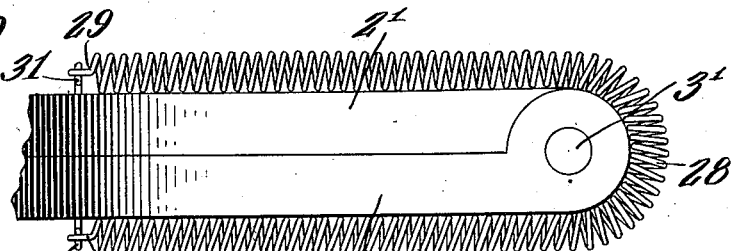
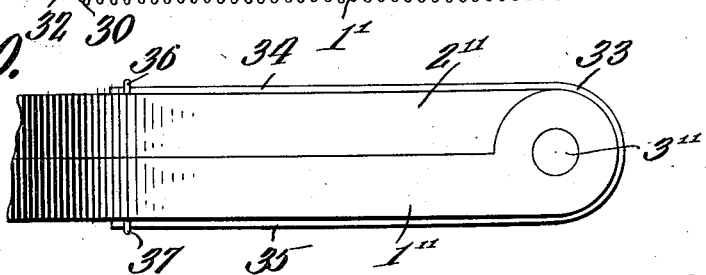
Witnesses
J. R. Tomlin
L. H. Wilson
Frank Obiols,
Inventor
by C. A. Snow & Co.
Attorneys
COLUMBIA PLANOGRAPH CO., WASHINGTON, D. C.

UNITED STATES PATENT OFFICE.

FRANK OBIOLS, OF WINNEMUCCA, NEVADA.

TRAP.

1,031,728.  Specification of Letters Patent.  Patented July 9, 1912.

Application filed November 25, 1911. Serial No. 662,517.

*To all whom it may concern:*

Be it known that I, FRANK OBIOLS, a citizen of the United States, residing at Winnemucca, in the county of Humboldt and State of Nevada, have invented a new and useful Trap, of which the following is a specification.

The present invention relates to improvements in traps, the primary object of this invention being the provision of a trap especially designed for use in capturing wild horses, cattle and big game, said trap being composed of two collapsing or folding members having a tension to separate, and means for disposing a flexible loop so that when the members are released the loop will be placed about the leg of the animal and drawn taut therearound so as to fasten the trap to the leg of the animal, or to fasten to the leg of an animal an impeding means that will render the capture thereof easy.

A further object of the invention is the provision of a trap having two spring separated members adapted to be placed to lie in parallel the lower or base member being provided with a cupped portion having mounted therein a pivoted treadle or foot piece normally holding the members collapsed, said cupped portion being further provided with a means for holding and guiding a flexible loop whose terminal is connected to the free end of the upper member, so that when the treadle or foot piece is depressed by the animal the upper member will be released so as to pull upon the flexible connection and draw the loop about the leg to insnare the animal.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a perspective view of the complete trap set. Fig. 2 is a longitudinal sectional view of the trap in set position, the same being broken away in the center to foreshorten the same. Fig. 3 is a similar view to Fig. 2 of the upper pivoted member in the act of catching or pulling the loop about the leg of an animal. Fig. 4 is a cross section taken through the pivotal or hinge end of the respective members. Fig. 5 is a perspective view of the under side of the free end of the upper member of the trap. Fig. 6 is a perspective view of the treadle and trigger. Fig. 7 is a cross section on line 7—7 of Fig. 3. Fig. 8 is a detail perspective view of the flexible loop device adapted to be freed from the trap when engaging an animal. Figs. 9 and 10 are views illustrating modified forms of spring connections for throwing the trap.

Referring to the drawings, the numeral 1 designates the lower or base member of the trap while 2 designates the upper or pivoted member thereof, the same being hingedly connected by means of a pin 3 provided upon its outer ends with the removable nuts $3^a$. The base 1 and pivoted member 2, are both made of such material and weight that when the animal is caught that the same will act as an impediment that the animal will drag but be so impeded as to render the capture of the animal very easy. The same may be constructed of any material or if so desired the base 1 may be fast to the ground or any desired object.

In order to normally exert a tension to separate the pivoted member 2 from the base 1 and retain the members in the same horizontal plane, the coiled springs 4 are placed upon the ends of the pin or shaft 3 beyond the outer faces of the respective members 1 and 2 so that the U-shaped terminals 5 and 6 of the said springs bring their terminals 7 seated within recesses 8 upon the upper face and the lower face respectively of the members 1 and 2. By this means it will be seen that the tension of the springs acts to separate the member 2 from the member 1.

Carried by the outer free end of the member or base 1 is a circular cup-shaped portion or bowl 9 having the upper outwardly flared or rolled rim 10 and the loop receiving groove or annular shoulder 11 for the reception of the flexible loop or slip lasso 12, whose free end is connected to the bar 13 at the under side of the pivoted member 2. When the parts are in the position to entrap an animal they assume the position as shown in Fig. 2, while when the member 2 is released, the loop 12 will be thrown or passed about the foot and leg of the animal as indicated in Fig. 3, the action of the springs moving the member 2 upwardly and drawing the loop more tightly around the animal's leg and thereby securing it to the trap which acts as an impediment in the flight of the animal. The member 1 is further provided with the bottom 14 which is provided with an aperture 14' in the bowl portion 9 so that the trigger 17 of the device may be readily reached for manipulation in securing the member 2 in the position as shown in Figs. 1 and 2. The base is also provided with the recessed portion 15 and bridging the same is a pin 16 which pivotally supports the trigger or catch 17 in said recess so that its hooked portion 18 will be disposed to permit the treadle or foot piece 19 to be moved from the position as shown in Fig. 2 to that shown in Fig. 3. When in locked position as shown in Fig. 2 the curved projection 20 on the base will fit within the recess 21 so as to act as a rest and take the weight, should the plate or pivoted member 2 be stepped upon by the animal, from off the hook 18, which as shown will engage the pin 22 and retain the parts in the position as shown in Fig. 2.

In use the trap is generally hidden below the surface, the parts being concealed and protected by branches and the like so as to prevent the dirt from rendering the trap inoperative and so as to prevent the animal from seeing the trap. By this structure of trap the portion 2 may be walked upon by the animal and the same will not be released until the foot of the animal will enter the flared portion 10 of the bowl and engage the foot treadle or disk 19, at which time the trigger 17 will be released and the parts will assume the position as shown in Fig. 3 except that the member 2 will continue in its movement until it is in the same horizontal line with the base 1.

In the form of lassoing or looping connection shown in Figs 1, 2 and 3, the same is made fast to the free end of the member 2, but where it is desired to attach an impediment to the animal and not permit the trap to be moved from the place of setting, a spring 23 is connected to the side of the member 2 and in this is placed the flexible connection 24 as illustrated in Fig. 8, a loop 25 being placed in the same position as the loop 12 while the free terminals 26 of the connection 24 are provided with the weighted balls 27, the connection 24 being of such a length that when the animal has the loop placed upon his leg as illustrated in Fig. 3, the connection will be released from the trap and the free ends carrying the balls 27 will entangle the animal's leg and render the catching more easy.

As shown in Fig. 9, the members 1' and 2' are hingedly connected by means of the pin 3' the structure being identical to that shown in Figs. 1, 2 and 3, while in lieu of the springs as shown therein, a single coiled spring 28 having its terminals 29 and 30 connected to the eyed pins 31 and 32 upon the exterior faces of the respective members 1' and 2', is employed, the action of this spring being identical to the action of the spring as shown in Figs. 1, 2 and 3, that is an action to throw the member 2' in horizontal alinement with the member 1'.

In Fig. 10 another modification of spring connection is shown wherein the two members 1" and 2" which are connected with the pin or hinge 3" have the single bend 33 connected at the hinge portion thereof while the terminals 34 and 35, respectively, pass through eyes 36 and 37, respectively, connected to the members 1" and 2". The action of this spring is similar to that shown in Fig. 9 and the other views.

From the foregoing description taken in connection with the drawings, it is evident that a trap constructed according to the present invention is especially adapted for use in the capture of wild animals, wild horses, wild cattle and big game, and that the said trap may be so constructed and of such a size, that when the flexible connection or loop carried thereby is fastened to the leg of an animal the same will act as an impediment and prevent the flight, to such an extent as to render the capture of the animal easy. It is also evident that by this construction of trap that the base may be fastened securely in place to the ground and be provided with the impeding device as illustrated in Fig. 8 which will be released from the trap upon engagement of the said impeding device with the leg of the animal, the said impeding device being so constructed as to act as an impediment to prevent the flight of the animal, and to render the capture thereof easy. Further that by constructing the trap as herein set forth, the same may be buried or otherwise hidden from view and may be walked upon by various animals without operating the trap unless the treadle or foot piece 19 is engaged.

What is claimed is:

1. A trap, having a base member, said base member being provided with a cupped shape enlargement at one end thereof, a throwing member pivoted at one end to the end of the base member opposite the cupped portion, a spring for normally holding the members extended and in the same horizontal plane, a trigger located in the cupped portion of the base, for locking the base and throwing members in closed relation and against the tension of the spring, and a flexible leg engaging member held in encircling position by the upper edge of the cupped portion of the base and connected to the throwing member.

2. A trap, having a longitudinally disposed base having an enlarged cupped portion at one end thereof, a throwing member substantially the same width and length of the body portion of the base having one end pivotally connected to the free end of the base, a spring connected to both of said members and exerting a tension to hold the members in extended position and in the same horizontal plane, a treadle catch pivoted to the main member and disposed within the cupped portion thereof, means carried by the free end of the other member to be engaged by the catch to retain the members closed and against the tension of the spring, and a flexible leg encircling member carried by the free end of the other member, said flexible member being formed in the shape of a loop and surrounding the rim of the cupped portion when the trap is set.

3. A trap, having a longitudinally disposed plate, with an enlarged circular cupped portion at one end, another plate having one end pivotally connected to the end of the first plate and having its free end disposed to project slightly within the rim of the cupped portion of the base plate when the plates are in closed position, a spring for normally holding the plates extended and in the same horizontal plane, a coacting trigger device carried within the cupped end of the first plate and engaging the free end of the second plate for locking the plates together against the tension of the spring, and a flexible leg encircling member carried by the free end of the second plate and disposed to have a loop thereof encircling the rim of the cupped portion of the first plate when the trap is set.

4. A trap, having a base member having an enlarged cupped portion at one end, the upper rim of which is provided with a peripherally disposed recess, the other end of said base being a hinge member, another member hingedly connected at one end to the hinge member of the base and disposed to describe a semi-circle from closed to extended position, a pin carried thereby, a coacting treadle catch carried within the cupped end of the base member and the free end of the hinged member for engaging the pin to lock the members in closed position, a spring for normally exerting a tension to separate the members, and a flexible leg encircling member having one terminal connected to the free end of the hinged member the loop thereof when in leg encircling position fitting within the peripheral groove of the cupped portion of the base member.

5. A trap adapted to act as an impediment and to be automatically connected to an animal, comprising a base member, a throwing member hinged to the base member, a spring connecting said members to normally exert a tension to hold both members in a straight line, said members being constructed to collapse one upon the other when in set position, a cup-shaped foot guiding portion formed integral with the free end of the base provided with a reduced rim upon the face adjacent to the end of the hinged member, a treadle pivotally mounted in the base and having a foot piece disposed concentrically of the cupped portion, coacting means carried thereby and by the free end of the hinged member for locking the members in collapsed position, a lasso composed of flexible material, having one end connected to the free end of the hinged member and when the trap is set disposed to have the loop thereof surround the rim of the cupped portion, and coacting projecting and recessed portions carried by the base and hinged member to assist in alining the members when in collapsed position.

In testimony that I claim the foregoing as my own, I have hereto affixed my signature in the presence of two witnesses.

FRANK OBIOLS.

Witnesses:
  Thos. D. Salter,
  R. D. Pickett.

---

Copies of this patent may be obtained for five cents each, by addressing the "Commissioner of Patents, Washington, D. C."